Aug. 15, 1944. R. C. YEOMAN 2,355,771
LOAD TRANSFER DEVICE AND TIE BAR
Filed Nov. 27, 1939 5 Sheets-Sheet 1

Inventor
Ray Cyrus Yeoman
by
Attorney

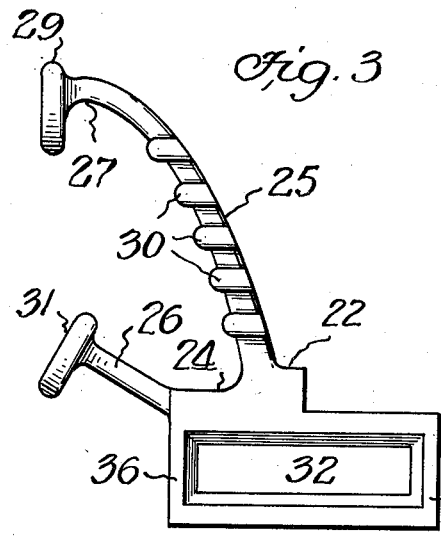
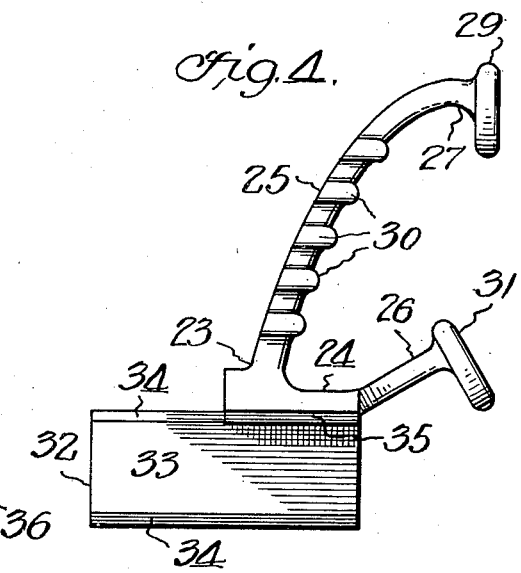
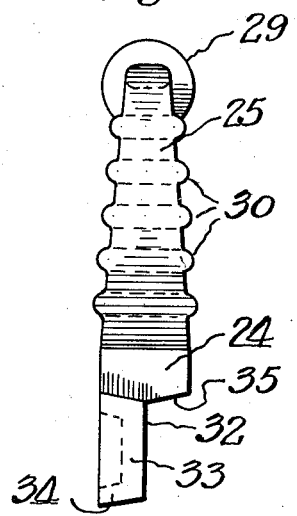
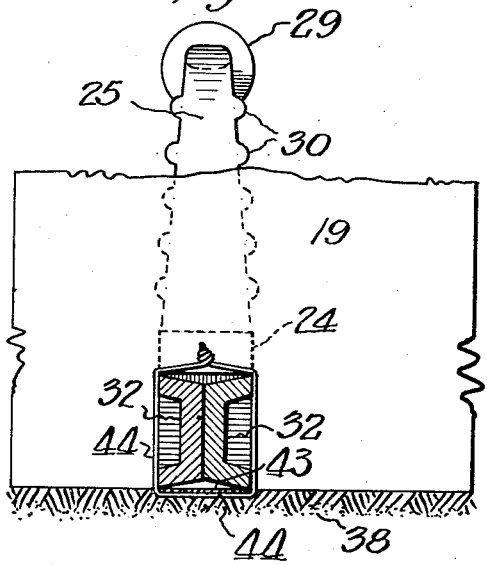
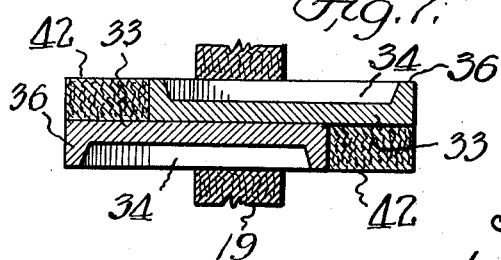

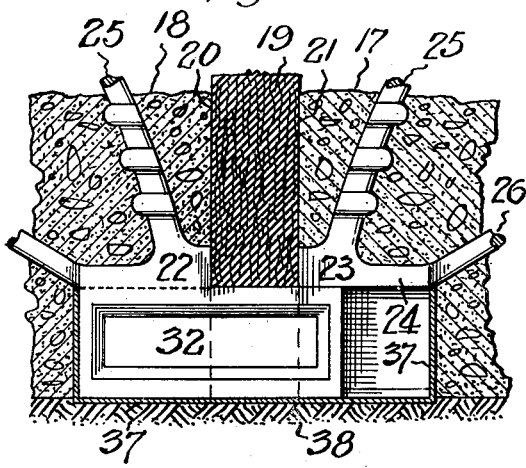
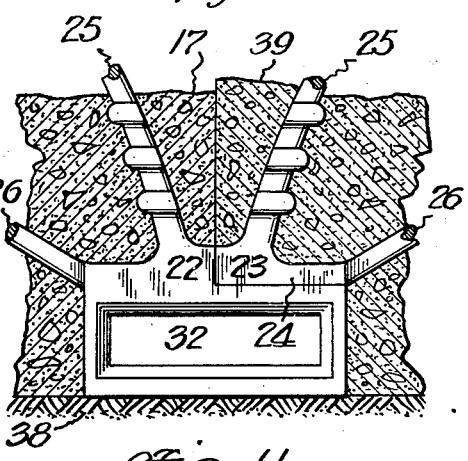
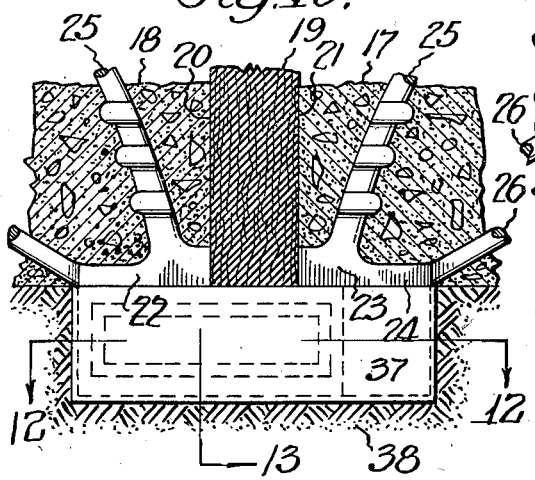
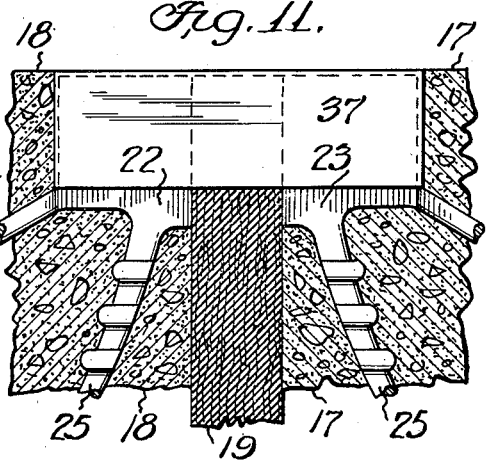
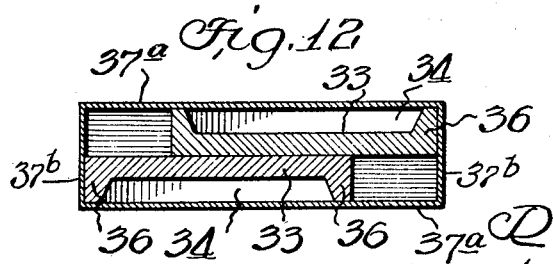
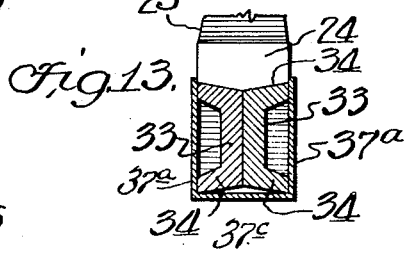

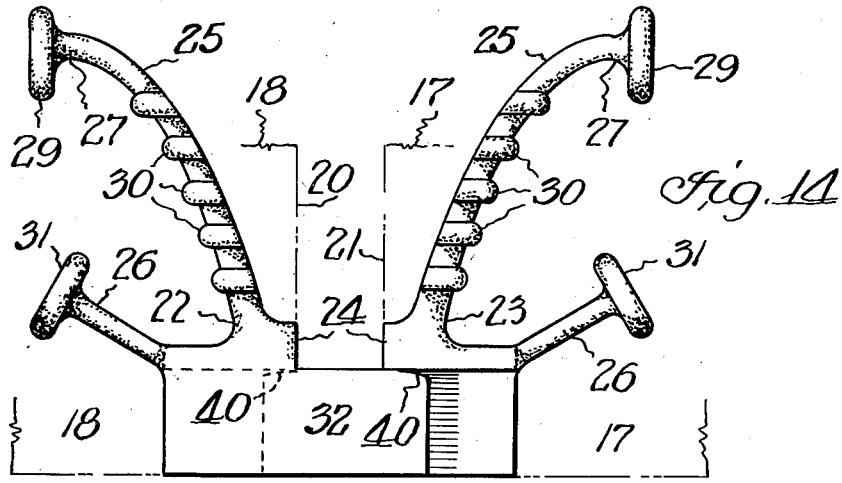
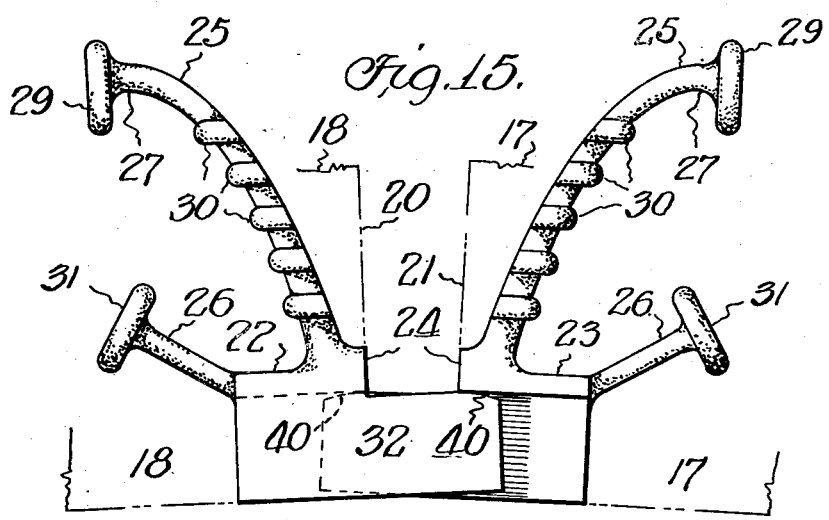
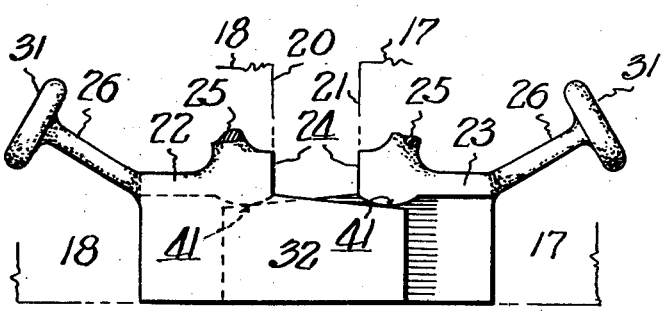

Aug. 15, 1944.   R. C. YEOMAN   2,355,771
LOAD TRANSFER DEVICE AND TIE BAR
Filed Nov. 27, 1939   5 Sheets-Sheet 5
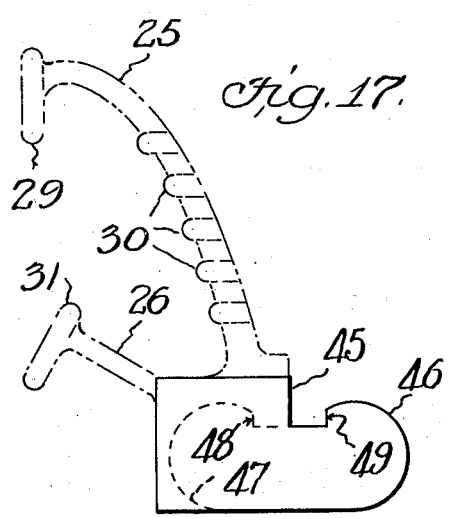
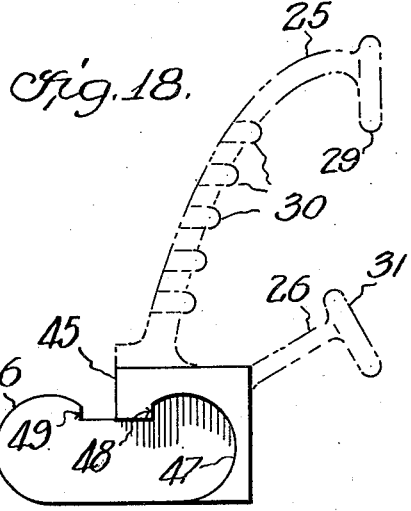
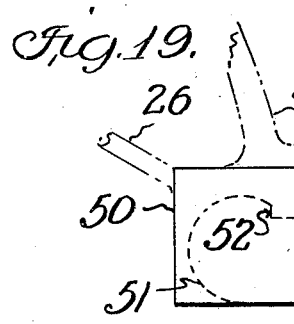
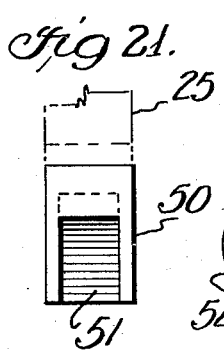
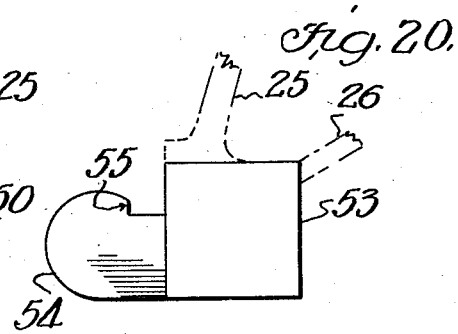
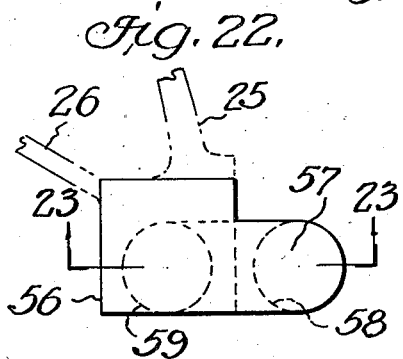
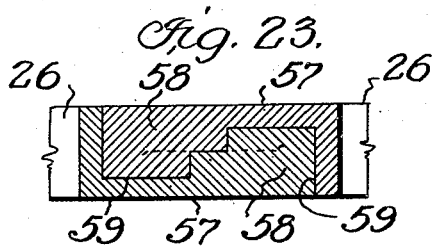
Inventor
Ray Cyrus Yeoman
by
Attorney Patented Aug. 15, 1944

2,355,771

UNITED STATES PATENT OFFICE 2,355,771

LOAD TRANSFER DEVICE AND TIE BAR

Ray Cyrus Yeoman, Lufkin, Tex., assignor to Texas Foundries, Inc., Lufkin, Tex., a corporation of Texas Application November 27, 1939, Serial No. 306,221

12 Claims. (Cl. 94—8)

My present invention relates to the construction of bridges, masonry and other concrete structures, and particularly to the building of concrete pavements, and more particularly to an improved load carrying unit and tie bar adapted to replace the common dowel to adequately provide for transmitting a concentrated load across the space intervening between the end faces of adjoining concrete road slabs and serve as a tie to bond the adjoining slabs together.

This application is a continuation in part of my copending application Serial Number 290,261 filed August 15, 1939, issued November 4, 1941, as Patent No. 2,261,602.

In the building of concrete pavements, engineers have been confronted with the problem of maintaining the surface of the concrete smooth and uninterrupted by breaks and blow-ups occasioned by the relative movement of the adjoining slabs.

The need for both longitudinal and transverse joints in concrete pavements has been successfully demonstrated by theory and by extensive experience. Longitudinal joints, which divide the slab into lanes ten to twelve feet in width are required to prevent the unsightly and detrimental longitudinal cracks that otherwise may be expected to develop; transverse expansion joints are required at reasonable intervals, to prevent compressive failures or blow-ups; intermediate transverse contraction joints, similar to the expansion joints, are required at frequent intervals if cracks due to curling or warping stresses are to be eliminated.

More and more concrete pavement is therefore being originally constructed in relatively short slabs, as it has been found that long ribbons of concrete ultimately break up into relatively short slabs which readily disintegrate due to lack of reinforcement at the joint face.

When constructing a concrete pavement with transverse joints which divide the pavement into a series of short adjoining slabs, it has been found necessary to bridge across the space intervening between the slab ends, to reinforce the slab ends and restrict the upward movement or curling of the slab ends due to warping, and primarily to carry the imposed loads of vehicular traffic from one slab to the next adjoining.

When constructing a concrete pavement with longitudinal joints which divide the slab into lanes, it has also been found necessary to bridge across the space intervening between the adjoining edges of the slabs, to reinforce the slab edges to limit and control the effects of warping, and primarily to carry the imposed loads from one to the next adjoining slab; further, to hold the adjoining edges of the slabs in close contact so that the joint will act as a hinge, the tie bars, in this case, are preferably designed to limit their resistance to the upward curling of the slab edges, as it is believed evident that if too great a resistance is set up in the tie, the warping of the slab edges may invite failure in other portions of the slab.

The common dowel has been used extensively both in transverse joints and in longitudinal joints.

Many have provided means for reinforcing the common dowel when imbedded in the slab. But the common dowel, when subjected to repeated load, is likewise subjected to reversal of stress under load, regardless of its reinforcement. The constant and repeated reversal of stress in any metallic bar is fatiguing to both the bar and the concrete bearing and ultimately leads to the complete destruction of the bar and the concrete in bearing and thus renders the bar useless as a load transfer element.

Therefore, the primary object of my invention is:

(a) To provide a device, which, when placed in series and at intervals along the slab edge, whether it be a longitudinal or transverse joint, and when anchored into the faces of the adjoining concrete slabs, will support the slab edges against local bending transverse to the joint when acted upon by a load applied to one or both slabs and over any one or all of the devices in the series; and (b) To produce a two-piece structure of counterpart and complemental members preferably identical in construction—duplex, i. e. having but two parts that operate at the same time and in the same way, whereas the common dowel—the simpler form—has but one part; and, (c) To devise a structure which is self-aligning and adaptable to self adjustment to the irregularities presented in field assembly occasioned by improper placement or displacement during the building of the pavement; and (d) To provide a structure which is not susceptible to excessive wear, corrosion or freezing due to erosion or corrosion of the component parts; and (e) To construct each part of the device as a single unitary member which may be interchangeable when used in pairs, inexpensive, simple and durable; and (f) To minimize the machining or tooling required to effect bearing surfaces; and (g) Particularly to eliminate any clearance between bearing surfaces and thus to accomplish maximum bearing instantly upon the application of load; and (h) To eliminate destructive stresses and strains occasioned by the wedging action due to the lateral misalignment of the unit; and (i) To provide a unit which is adaptable to the inclusion of an expansion element between the end faces of the adjoining slabs to keep the concrete constantly under compression as disclosed in my co-pending application, Serial No. 180,290 issued February 11, 1941, as Patent No. 2,231,488; and (j) To produce a cantilever type bridging element which eliminates and has no reversal of stress under load as the load crosses the joint as is the case of any dowel whether or not it is in bearing; and (k) To reduce the high bearing stresses existing at the edge of the slab by providing a greater bearing area in contact with the material of the slab; and (l) To minimize the high edge stresses by virtue of radiating anchors adapted to absorb, transmit and distribute the load to and within the slab; and (m) To reduce the deflection of the bridging member by reducing the effective length of the bridging members; and (n) To increase the load transmission capacity of the bridging member by virtue of its cross section and reduction in length; and (o) To provide an air chamber or compressible member at the end of the bridging member so that the slabs may freely move without obstruction by the bridging and load transfer member; and (p) To produce a unit which is also adaptable for installation where one slab is poured at a considerably later period than the adjoining slab whereby the companion units may be affixed at a subsequent date without destroying the efficacy of load transfer; and (q) To devise a unit particularly adaptable to fabrication from any cast or malleable iron, as all core work has been eliminated, thus making the device relatively simple and inexpensive to produce; and (r) To design a structural member, which, when placed upon the subgrade, will extend into the body of the slab, utilizing approximately the full height of the slab in shear; and (s) To provide a load transfer device or tie bar which may be placed directly upon the subgrade, and receive its support from the subgrade during the pouring operation and without the employment of any additional supporting devices such as chairs, stakes, etc. as are now used in the support of the common dowel bar; and (t) To product a unit which is susceptible of reversed positioning, that is, a unit which may be placed bottom up from the top of the slab after the concrete has been poured, and after the screed has passed, preferably by means of vibration, thus greatly simplifying installation; and (u) To simplify installation with any type of joint forming device, to provide for the assembly to the joint by means of any of the well known forms of ties, such as bolt, rivet, spot weld, wire, spring or clamp, all of which may adequately secure the associated members in proper position; and (v) To further reduce the cost of installation by providing a unit, the bridging portion of which may be dropped below the bottom of the slab to facilitate the placing of the joint filler, or which provides for leaving the gap open for cleaning and the subsequent replacing of the joint filler, or for inspection; and (w) To produce a unit which in use may be susceptible of two opposed functions, that is: the unit per se may be cast in place in the slab and used strictly as a tie bar, preventing the separation of the two members which make up the unit, and as the unit is anchored to the respective adjoining slabs, the slabs then become anchored against relative longitudinal or transverse movement; and when it is desirable that the slabs be permitted to move without restraint, the bridging portions of the unit may be partially housed to prevent bond with the slab, and thus permit of the unrestricted movement of the slabs; and (x) To make it possible to effect an appreciable amount of reduction in the curling or warping stresses that are caused by restraint in the joint, and the proper distribution of stresses within the slab to effectively prevent failure of the slab and at the same time prevent the tie bar from being overstressed; and (y) To provide for a hinge type joint, to permit hinge action of joint without impairing load transmission; and (z) To give to the engineer an inexpensive, simple, durable, positive action, two-piece construction load transmission unit which requires no great skill or expensive equipment to install, make, or use, and which may be effectively sealed; a load transfer device for holding the ends of adjacent concrete road slabs in surface alignment.

My present invention has these and other objects, all of which are explained in detail and may be more readily understood when read in conjunction with the accompanying drawings (five sheets) which illustrate a preferred embodiment of my invention, it being manifest that changes and modifications may be resorted to without departure from the spirit of the claims forming a part hereof.

In the drawings:

Figs. 3 and 4 are side elevations of the two units comprising the load transfer device shown assembled in Fig. 2, illustrated in their respective positions prior to assembly;

Fig. 5 is an end elevational view of the member shown in Fig. 3;

Fig. 6 is a vertical section through the unit taken on line 6—6 of Fig. 2, the concrete has been omitted and the joint member broken away for purpose of illustration;

Fig. 7 is a sectional view taken of the line 7—7 in a horizontal plane, Fig. 2, the concrete has here again been omitted for purpose of illustration;

Fig. 8 is a fragmentary section similar to Fig. 2, showing the bridging portion of the unit assembled within a container which partially encloses the lower portion of the assembled unit;

Figure 1:
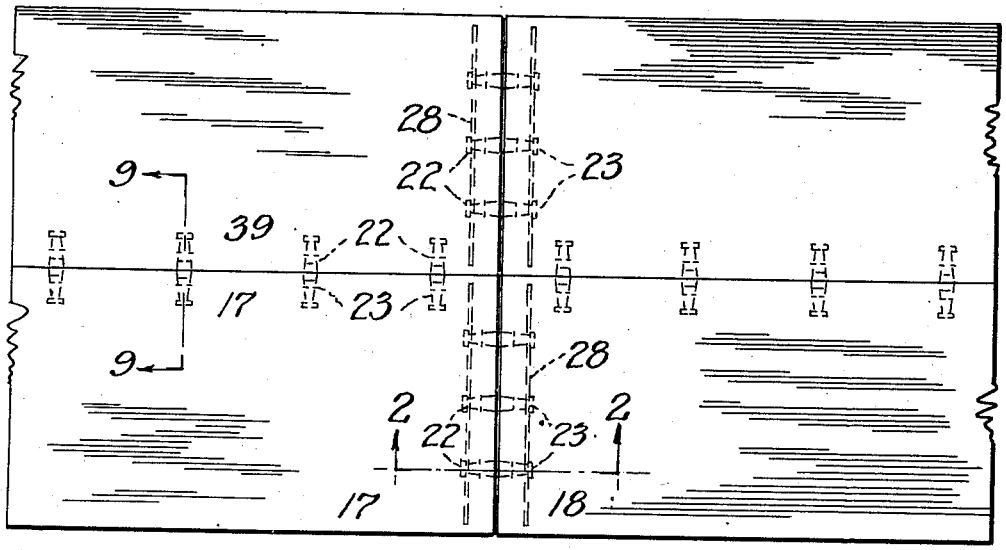
Fig. 1 is a fragmentary plan view of a concrete pavement shown divided, by means of a longitudinal joint, into two lanes, and by means of a transverse joint, into a plurality of relatively short adjoining slabs; my invention is shown in dotted lines in its relative position to the various joints.
Figure 2:
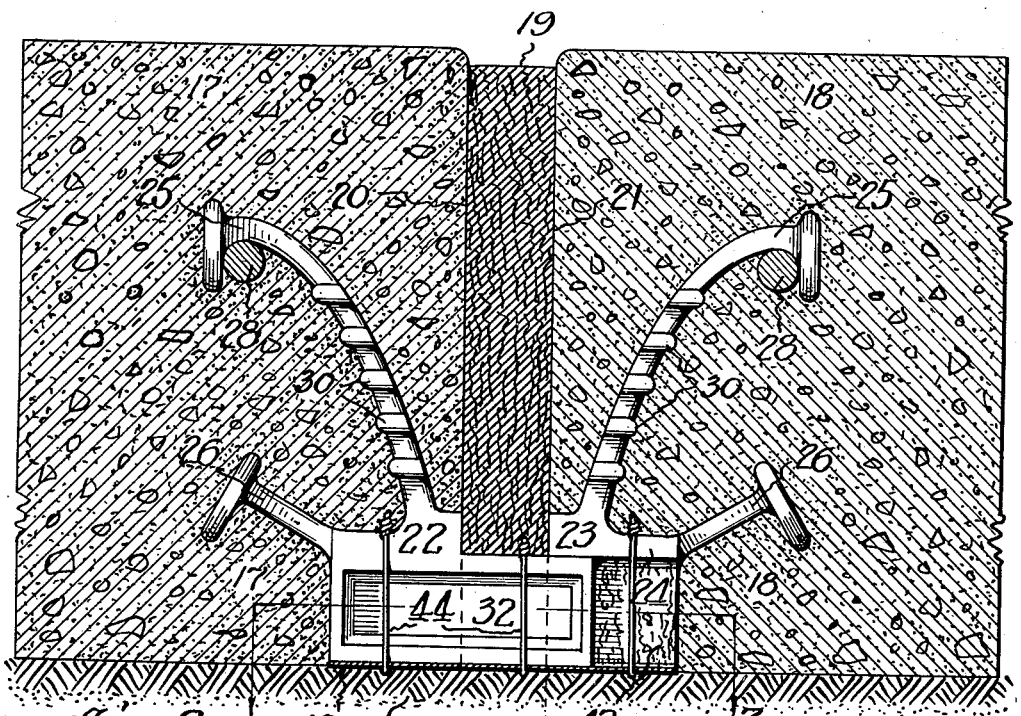
Fig. 2 is a fragmentary section taken in a vertical plane on line 2—2 of Fig. 1, and illustrates my invention as applied to a transverse joint connecting the adjoining ends of slabs spaced by means of an expansion joint member.

Fig. 9, a view similar to Figs. 2 and 8, illustrates the unit as applied to a longitudinal joint, and is taken on line 9—9 of Fig. 1, no joint is shown between the faces of and spacing the adjoining slabs, and the gap or space between the ends of the slabs is slight to start with and difficult to measure, no container for the bridging members is shown, as here it is desirable that the bridging members key directly to the slabs;

Fig. 10 is similar in all respects to Fig. 8 except that the container shown in section in Fig. 8 is here shown in elevation and the bridging units are shown placed below the bottom of the slab;

Fig. 11, a view similar to Figs. 8, 9 and 10, illustrates the unit placed bottom side up at or adjacent the top surface of the pavement with the anchors extending downwardly as contrasted to upwardly and outwardly as heretofore illustrated;

Fig. 12, like Fig. 7, is a horizontal section through the bridging portions taken on line 12—12 of Fig. 10 showing the relation of the container to these elements; here again the concrete and also the joint member has been omitted for purpose of illustration;

Fig. 13 is a vertical fragmentary section on line 13—13 of Fig. 10, and like Fig. 12 the concrete and joint member has been omitted;

Fig. 14 is a fragmentary elevational view of the lower part or bridging portion of the unit wherein the bearing surface on the tongue-like bridging member is shown deformed to augment the hinging action of the unit;

Fig. 15, like Fig. 14, illustrates the movement of the hinge, greatly exaggerated;

Fig. 16 is a view similar to Figs. 14 and 15 illustrating a further modification wherein the bearing surface on the bearing portion of the unit is shown deformed to further assist in the hinging action of the unit without impairing load transmission;

Figs. 17 and 18, like Figs. 3 and 4, illustrate side elevations of two units comprising a modified form of load transfer device shown in their respective positions prior to assembly, the anchors being shown in broken lines as not comprising a specific form of my invention in this particular modification;

Figs. 19 and 20, a further modification, illustrate a pair of non-interchangeable units, in that Fig. 19 shows the female member and Fig. 20 the male member of the assembly, the anchors are also indicated in broken lines;

Fig. 21 is an end elevation of Fig. 19;

Fig. 22 is a still further form or modification, shown in elevation, of one of a pair of units comprising a load transfer device when assembled in pairs as before illustrated; and Fig. 23 is a fragmentary section on line 23—23 of Fig. 22, illustrating the assembly of a pair of units such as shown at Fig. 22.

The structures illustrated involve the specific application of one form of my invention to a roadway slab. For purposes of description only, I choose to so define my invention as applied to this particular construction; however, I wish it understood that my invention is equally effective when adapted or used in any poured or precast structure, whether it be a roadway slab, retaining wall, swimming pool, reservoir, canal lining, warehouse floor, dock, industrial plant, sidewalk, driveway, airport runway, bridge, etc., for, as a matter of fact, it is applicable to an almost unlimited number of structures; and while I describe my invention in its preferred embodiment, it is to be further understood that the words which I use are words of description and not of limitation. Reference characters refer to similar parts throughout the several views of the drawings.

My invention first contemplates a load transfer or tie bar device for bridging a gap between the adjacent ends of two horizontally disposed and longitudinally aligned concrete slabs 17 and 18, divided by a transverse joint member 19, against which bear the opposed end faces of the slabs 20 and 21. The device preferably comprises two counterpart and relatively reversed rigid members 22 and 23 having their major portions respectively imbedded in the two slabs, positioned at substantially the bottom surface of the slabs, having their major axis parallel with the top surface thereof, normal to the plane of the joint, and spaced in pairs at intervals throughout the width of the slab.

Each device comprises a pair of compact and infrangible members, preferably malleable iron castings 22—23 which are pre-eminently, but not necessarily, duplex in character; they are complemental to each other and may be interchangeable. The casting for the member 22 may be made from the same pattern as is the casting for the member 23.

Each casting or major part comprises a horizontally disposed substantially angle shaped bearing portion 24 opening at the end of the slab in which that part is imbedded and having the axis or surface of its bearing horizontal and at right angles to its respective slab end. A pair of integral arms 25—26, so called load-transmittal elements, diverge away from the open end of the bearing portion.

The arm 25, starting from a point substantially adjacent the slab face, extends upwardly and away from the slab face at an acute angle and back into the body of the slab to a point well above the neutral axis of the slab, where it terminates in a hook portion 27, which is adapted to engage a load distribution bar 28. Such bars 28 are a common expedient in the art today, and are oftentimes placed parallel to the face of the slab a short distance in from the face, and to which the load transfer members are attached for assembly and load distribution. The arm 25 terminates in a substantially vertically disposed pad or web 29 which serves as a key in the concrete. Preferably, but not necessarily, I further provide a plurality of spaced apart fins or horizontally disposed and substantially parallelly aligned ribs or projecting corrugations 30 integral with the body of the arm 25 which serve the same purpose as the deformations on a standard steel reinforcing bar so common in use today. That is, the ribs 30, each in turn take up the load for distribution, and as each is stressed to its limit in bearing, and since the material of the slab has a lower modulus of elasticity than the metal structure of the unit, the material of the slab at the first corrugation, or the first rib 30 adjacent the bearing portion 24, deforms elastically (compresses a bit) under the initial increment of loading, thus allowing the stronger and stiffer metal anchor 25, to carry the next increment of load to the next adjacent or second rib 30, whereby said ribs one and two deform to pass on some load to rib number three, etc. progressively to the end of the anchor arm 25. In this way the load is progressively distributed throughout the weaker material—concrete, by the stronger metal anchor to which all the load has been applied. The arm 26 starts preferably from a point on the bearing portion 24 back from the joint face, and like the arm 25, it also extends upwardly but at an obtuse angle to the joint face and stops within the slab at a point substantially below the neutral axis of the slab, and like the arm 25, the arm 26 also terminates in a pad or key 31. The outer face of the bearing portion is shown cast flush with the end face of its companion slab, and the anchors 25—26 extend back into the body of the slab, both above and below the neutral plane of the slab as described.

From the face of the bearing portion projects an integral tongue-like portion or bridge 32, positioned directly adjacent and parallelly disposed to the bearing surface of the bearing portion 24. The bridge is adapted to project beyond the face of the bearing portion and extend into and slidably engage the bearing surface of the bearing portion 24 of the counterpart member.

The bridge 32, in cross section (see Figs. 6 and 7) resembles a standard structural shape, preferably a channel iron with the web 33 vertically disposed and flanges 34 horizontal. The top and bottom of the flanges 34 are slightly tapered and conform to the same taper which is given the bearing surface 35, they are symmetrical and congruent. The ends of the bridge are also flanged as at 36, thus establishing a recessed portion in the face of each bridge for the purposes hereinafter to be described.

Where my unit is employed in association with an expansion or contraction joint, and where it is desirable that the slabs be permitted to move without restraint, I find it expedient to partially enclose the assembled bridging members particularly as shown at Figs. 10, 12 and 13 by means of a container or shoe 37 which is substantially rectangular and has side walls 37a and end walls 37b and a bottom 37c, which partially envelop the bridging members and serve as a dam which prevents the ingress of foreign materials and especially the plastic concrete during the pouring operation, thus leaving the bridging members free to go and come laterally with the movement of the associated slabs, and in this arrangement, the units themselves close or seal the top of the container, and as shown at Fig. 10, the joint member 19 closes the top between the faces of the adjoining units. I contemplate that the container may even be filled with a lubricant to assist in the unrestricted sliding movement of each bridge against its associated bearing surface.

*Operation*

In operation, two identical units 22 and 23 are employed. As a pair they are preferably but not necessarily duplex in character, design and function. Each has two complemental parts—the bridge 32 and the bearing portion 24. Each operates at the same time in the same way, that is, the bridge 32 on one and the bearing 24 on the other act or co-operate simultaneously, thus differentiating from the common dowel—the simpler form, and likewise differentiating from those structures employing the use of a dowel in an assembled bearing.

As shown, a strip of asphalt, saturated felt or joint member 19 is placed in the gap between the end faces of the adjacent concrete road slabs 17 and 18. (I have shown this particular type of joint member for illustration only, as any of the well known designs of joints such as the air cushion metallic joint, rubber joint or metal plate may be employed with equal effect.) Openings are made in the joint through which openings pass the bridge members 32 as a pair of units 22 and 23 are assembled one on each side of the joint with their respective faces flush with and tightly locked against the outer walls of the joint. A block of compressible material 42, preferably similar to the joint material used, is placed at the end of each bridge, as shown at Fig. 7, and a plate 43 encloses the bottom only of the assembled units which are held together with wire ties 44. The bridge 32 of the unit 22 slidably engages the bearing 24 of the unit 23 and the bridge 32 of the unit 23 likewise engages the bearing of the unit 22. The units are cast to the slabs in this relationship.

It should be particularly noted that in assembly the top surface of the bridge has direct bearing against the inside top or bearing surface of the bearing member; any clearance whatsoever between these members is on the sides and bottom. There being no clearance between the top surface of the bridge and the internal bearing surface of its complemental bearing, maximum bearing is constantly maintained as differentiating from the common dowel which has to deflect to seat or find its bearing however so small the clearance be.

For illustration—as the moving wheel load passes from the slab 17 towards and onto the slab 18, slab 17 deflects, the load is picked up by the unit 23 and carried across the joint on the bridge 32 of the unit 22. When the load continues on and passes over the joint to slab 18, the unit 22 picks up the load which in turn is carried back and distributed into the slab 17 through the bridge 32 on the unit 23. There is here a reversal, but not a reversal of stress in the bridging element 32 per se. The individual bridging element 32 of each unit, due to its clearance on the bottom and its constant bearing on top carries the load in but one direction only as compared to the common dowel assembly whereby the dowel—a single element—is constantly subjected to a reversal of stress which has been found to be fatiguing and highly detrimental, calling for a greatly increased cross-section and double bearing surfaces.

In assembly and installation it is desirable that the units be affixed to the joint member 19, the completed assembly then installed on the subgrade 38 as a unit. To do this it is particularly advantageous that the load transfer units be locked or affixed to the joint member in a suitable manner by means of ties 44 or other similar locking means thus preventing their accidental removal or displacement during this period.

It will be noted that the assembled bridge does not necessarily extend the full depth of the bearing provided in its complementary unit, thus an air chamber is established between the end wall of the bearing and the end of the bridge (Fig. 12) which permits the slabs to uninterruptedly go and come due to their change in volume, with the consequent expanding and contracting of the joint space between the adjacent end faces of the respective slabs as before described.

My invention further contemplates a load transfer or tie bar device for bridging a gap between the adjacent ends (or sides) of two horizontally disposed and transversely aligned concrete slabs where the pavement is poured in so-called lanes, and where it is desirable oftentimes, to provide a hinge action between the longitudinally placed and parallelly disposed slabs, and thus limit the resistance set up by the load transfer members connecting the slabs, but still provide for adequate load transfer there-between as previously outlined.

With particular reference to Figs. 1 and 9, it will be noted that the tie bar or load transfer unit which comprises the members 22 and 23, bridges the space between the adjoining slabs 17 and 39 as before, but that here I do not necessarily employ a joint member between the adjoining faces of the slabs. In practice, it is the usual custom first to pour one slab (such as 17) and after that has set, come back and pour slab 39, and as one slab is poured directly against the other, the space between the two is very small, oftentimes limited only by the amount of shrinkage in the concrete itself. In the claims appearing in this specification, the use of the word "gap" is intended to imply and contemplate this small clearance as well as the larger space or opening established by the use of a joint member as before described.

Where it is desirable, as in the case of a longitudinal or center joint, to omit a joint member permitting of the expanding of the slab sections and their movement towards one another with the resultant closing of the joint opening, I find it expedient to omit the use of the container 37 as shown in Figs. 10 and 12, and as at Fig. 9, cast the rigid members 22—23 directly in the concrete. In this case, the depressed portion of each tongue-like bridging member 32, which is bounded by the flanges 34—34 and end walls 36—36, becomes filled with the plastic concrete, which sets and keys the bridging members—each to both slabs, thus restricting their lateral movement which prevents the slabs from separating, at the same time, however, the bridges 32—32 serve as load transfer members, but permit of the hinging action of the slabs to a degree and thus relieve the slabs from any appreciable amount of warping stresses that are caused by restraint in the joint, and further providing for the proper distribution of these stresses within the slabs to effectively prevent failure of the slabs and at the same time prevent the tie bar from being over-stressed.

To augment this hinging action of the assembled units, I find that it may be desirable, although not imperative, to build this feature into the body of the load transfer device itself. Figs. 14, 15 and 16 are illustrative.

In Figs. 14 and 15, I have shown the tongue-like bridging member 32 beveled at 40 near its outer or free end, which permits the unit 23 to partially rotate without losing its bearing contact with unit 22 and without impairing the load transmission feature of the device. Again at Fig. 16, I have further illustrated the bearing surface on the unit 22 as being deformed at or near its outer face or end by means of a curved bulb-like formation 41 extending below the original bearing surface and against which the bridge member 32 of the unit 23 may rock or partially rotate without impairing the load transmission feature. These are illustrations only, and it must be noted that the details are greatly exaggerated for purpose of illustration.

I have previously described how the end walls 36—36 of the structure shown at Fig. 9 may key the device to the concrete and restrict the relative lateral movement or separation of the two members 22—23 comprising the load transfer unit. I find that it is often desirable to positively lock the units to prevent separation, and accordingly have devised modified forms such as shown as Figs. 17 to 23 inclusive to carry out this principle. Figs. 17 and 18 show the complemental units prior to assembly as comprising a bearing portion 45 from which suitable anchors such as 25 and 26 extend as before, back into the slab and are keyed with suitable pads 29—31 and deformations 30 as before described. Here, however, a bridging member 46 extends forwardly from the front face of the bearing portion 45 and is adapted to span the space between the adjoining slab faces, enter and lock in a recess 47 formed in the opposite unit as shown. The recess 47 is preferably of the same or similar to the contour of the end of the bridging member, and is provided with a lip or relatively vertical bridge wall 48 adapted to seat against a similar vertical ridge 49 formed in the bridging member of the associated unit when assembled.

Whereas Figs. 17 and 18 illustrate truly complemental units, preferably identical in construction, at times I find it desirable to make these units non-interchangeable—that is, a pair of units comprising my device may be strictly male and female respectively, such as shown at Figs. 19, 20 and 21, where the bearing member 50 comprising the female member of the assembly is recessed at 51 and provided with the bridge wall 52, and wherein the male member comprises a bearing portion 53 with an extended bridging portion 54 which is provided with a ridge or transverse wall 55 and which, as before, is adapted to lock against the bridge wall 52 and prevent separation of the units when once assembled.

As a further modification of the structure illustrated at Figs. 17 and 18, I propose a unit such as illustrated at Figs. 22 and 23, which comprises a bearing portion 56 with anchors 25 and 26 as before and a protruding tongue-like bridging member 57 provided with a laterally disposed bulb-like portion 58 extending transverse to the line of movement of the respective assembled units and adapted to seat in a recess 59 provided in the opposite or complemental unit comprising my device.

It is contemplated that the load transfer units or tie bars may be installed in plastic concrete, cast in situ; and whereas I have not shown the specific structure, I wish it understood that my invention is equally applicable to pre-cast concrete, art marble, imitation stone, glass, terra cotta and other similar products or combinations thereof.

Having thus described my invention, what I claim as new and desire to secure by Letters Patent is:

1. A load transfer device for use in association with adjoining concrete slabs comprising a pair of spaced members each having a bearing portion adapted to be anchored to its related slab, a separate bridging portion rigid with each bearing portion and extending therefrom and adapted to span the gap between the spaced members and extend into and take bearing in the bearing portion of the oppositely disposed member so that a portion of the load applied to either member is imparted to the bearing portion of the opposite member, and wherein the bearing portion of each member in cross-section is in the shape of an angle iron having a top flange forming a bearing surface and a depending vertically disposed leg, and wherein the bridging portion of each member includes a vertical web and a laterally disposed top flange which is adapted to seat upon the under surface of the top flange of said bearing portion of the oppositely disposed member.

2. A load transfer device for use in association with adjoining concrete slabs comprising a pair of complemental members each having a bearing portion adapted to be anchored to its related slab, a separate bridging portion rigid with each bearing portion and extending therefrom and adapted to extend into and take bearing in the bearing portion of the oppositely disposed and complemental member so that a portion of the load applied to either member is imparted to the bearing portion of the opposite member, and wherein a portion of the bridging portion of each member is depressed forming a cavity into which the plastic concrete is adapted to flow and set and thus lock the respective members in their assembled relation and restrain their relative movement and the separation of the slabs.

3. A load transfer device for use in association with adjoining concrete slabs comprising a pair of spaced members each having a bearing portion adapted to be anchored to its related slab, a separate bridging portion rigid with each bearing portion and extending therefrom and adapted to span the gap between the spaced members and extend into and take bearing in the bearing portion of the oppositely disposed member so that a portion of the load applied to either member is imparted to the bearing portion of the opposite member, and wherein the continuity of the bearing surface between the bearing portion of one member and the bridging portion of the oppositely disposed member is interrupted by means of an irregular surface presented by one of the adjoining faces, to thus augment the hinging action of the slabs and prevent the device from being overstressed in tension.

4. A load transfer device for use in association with adjoining concrete slabs comprising a pair of spaced members each having a bearing portion adapted to be anchored to its related slab, a separate bridging portion rigid with each bearing portion and extending therefrom and adapted to span the gap between the spaced members and extend into and take bearing in the bearing portion of the oppositely disposed member so that a portion of the load applied to either member is imparted to the bearing portion of the opposite member, and wherein the continuity of the bearing surface between the bearing portion of one member and the bridging portion of the oppositely disposed member is interrupted by means of an irregularity presented by one of the adjoining faces, to thus augment the hinging action of the slabs and prevent the device from being overstressed in tension, and wherein said irregularity consists of an enlarged rounded portion extending transversely of and integral with the bearing surface located at substantially the slab face.

5. A load transfer device for use in association with adjoining concrete slabs comprising a pair of spaced members each having a bearing portion adapted to be anchored to its related slab, a separate bridging portion rigid with each bearing portion and extending therefrom and adapted to span the gap between the spaced members and extend into and take bearing in the bearing portion of the oppositely disposed member so that a portion of the load applied to either member is imparted to the bearing portion of the opposite member, and wherein the continuity of the bearing surface between the bearing portion of one member and the bridging portion of the oppositely disposed member is interrupted by means of an irregularity presented by one of the adjoining faces, to thus augment the hinging action of the slabs and prevent the device from being overstressed in tension, and wherein said irregularity consists in the rounding off of the end portion of the bridging member.

6. A load transfer device for use in association with adjoining concrete slabs, comprising a pair of opposed complemental members each having a horizontally disposed bearing portion comprising a top wall and an integral side wall forming an angular section open at one side and open at the bottom, each member having a horizontally disposed bridging portion, the bridging portions extending oppositely and adapted respectively to span a gap between the adjoining slabs and each slidably engage the bottom face of the top wall of the bearing portion of its oppositely disposed member, so that a portion of the load applied to either member is imparted in a downward direction only to the oppositely disposed member, and means for anchoring each member to its related slab.

7. A load transfer device as per claim 6, which includes a yieldable member interposed between the opposed faces of said complemental members, and a compressible filler positioned adjacent the end of each bridging portion respectively.

8. A load transfer device as per claim 6, which includes a separable trough-like member adapted to engage and enclose a portion of the associated bridging portions of the complemental members.

9. A load transfer device for bridging a gap between confronting faces of a pair of paving slabs, said device consisting of a pair of identical but relatively reversed rigid members each including a body and anchoring means projecting from the body, each body having a tongue-like extension forming a bridging portion, said extensions being positioned to lie side-by-side in use with the terminal of the extension of each member opposite the body of the other member, and complementary interlocking means on the terminals of the extensions and respective bodies to prevent relative longitudinal movement of the respective bodies.

10. The device of claim 9 wherein each body is provided with a lateral recess having an arcuate periphery and each extension has its terminal provided with a like periphery and engaging in the recess of the respective body to form the interlocking means.

11. In concrete highway construction, means for transferring loads between adjacent slabs and preventing relative vertical movements thereof comprising a flat bearing member secured to each slab and underlying a portion thereof in opposite relation to the member of the other slab, a part of each member being thicker than the remainder, and a flat bearing portion extending from the thicker part of each member beneath and in bearing relation to the thin part of the other member, the combined thickness of each portion and the overlying thin part being substantially equal to the thicker part of each member.

12. A concrete highway construction, means for transferring loads between adjacent slabs and preventing relative vertical movements thereof comprising a flat bearing member secured to each slab and underlying a portion thereof in opposite relation to the member of the other slab, a part of each member being thicker than another part thereof, and a flat bearing portion extending from the thicker part of each member beneath and in bearing relation to the thin part of the other member.

RAY CYRUS YEOMAN.